UNITED STATES PATENT OFFICE.

THOMAS A. EDISON, OF LLEWELLYN PARK, NEW JERSEY.

REVERSIBLE GALVANIC BATTERY.

SPECIFICATION forming part of Letters Patent No. 723,450, dated March 24, 1903.

Application filed November 28, 1902. Serial No. 133,116. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Reversible Galvanic Batteries, of which the following is a description.

In my application for Letters Patent filed October 3, 1902, Serial No. 125,802, I describe an improved reversible galvanic battery employing in the make-up of its oxidizable element a metal or compound thereof which reduces with difficulty, such as electrolytically-active finely-divided iron, and wherein an easily-reducible metal, like copper, mercury, or silver, or compounds thereof, is added to the oxidizable active material, so as to thereby secure better electrical contact between the particles of the active material and also to permit the cell to sustain a higher voltage throughout the entire period of discharge than would be the case if the readily-reducible metal were not used. In my said application I have made broad claims covering the use of such an easily-reducible metal or combinations thereof in the make-up of the oxidizable element of a reversible galvanic battery employing an alkaline electrolyte. I have also claimed, broadly, a reversible galvanic battery employing such a composite oxidizable element opposed to a depolarizing electrode containing in its make-up an electrolytically-active compound of nickel, and in said application I have finally made claims to the use of copper as a specific instance of a suitable readily-reducible metal capable of effective use in this art.

In the present application I propose to claim specifically mercury or a combination of mercury and one or more other readily-reducible metals, such as a combination of mercury and copper, as a suitable material or combination of materials for addition to the oxidizable active material of a reversible galvanic battery. I find, in fact, that mercury when employed in connection with copper for addition to the active oxidizable material possesses an advantage over the use of copper alone when mixed with the oxidizable material, as it preserves the surface of the copper from oxidation, and I am thereby enabled to do away with the use of flake graphite in the construction of the oxidizable electrode, and hence effect a better contact between the particles of the active material, as well as between the latter and the support. At the same time the employment of mercury results in the production of a superior cell in the respect that it is capable of sustaining a high voltage throughout the entire period of discharge.

In carrying my invention into effect in connection with the production of an electrode for a reversible galvanic battery employing as the oxidizable material electrolytically-active finely-divided iron I prefer to proceed substantially as follows: I first obtain electrolytically-active finely-divided iron by any well-known process, some of which have already been indicated in patents granted to me and which therefore do not require to be explained in detail. To the finely-divided iron, and generally when the latter is in a moist condition, I then add a sufficient quantity of ammoniated copper and of precipitated oxid of mercury to produce as a final product a mixture composed of sixty-four per cent. of iron, thirty per cent. of copper, and six per cent. of mercury. The addition of ammoniated copper and oxid of mercury to the electrolytically-active iron results in the copper and mercury being immediately reduced to the metallic state by the reducing action of the iron, a portion of whose particles becomes oxidized, while at the same time the particles of metallic copper will be coated with an amalgam of mercury, so as to be better preserved from the effects of oxidation. In the reaction ammonia is liberated as a gas. As a result of this treatment the exterior of each active iron particle will be coated with a porous envelop of amalgamated copper in extremely finely divided form mixed with a small proportion of iron oxid. This mixture may be immediately molded into briquets and used in a battery and does not require the employment of flake graphite or other foliated conducting material, although of course the latter may be used. I find that the employment of a mixture of copper and mercury, as explained, is superior to the use of copper alone. It will be understood, of course, that mercury may be alone employed as the added readily-reducible material, in which case enough of the precipitated oxid of mercury may be mixed with finely-divided electrolytically-active iron as to produce as a final result a mixture composed of twenty per cent. of mercury and eighty per cent. of iron. The proportions of mercury to iron or of mercury and copper to iron above stated give the best results per gram of iron; but obviously these proportions may be varied within wide limits without affecting the spirit of my invention. Although the results when mercury alone is used are even better in practice than when a mixture of mercury and copper is employed, the expense incident to the use of such relatively large amounts of mercury as are necessary when used alone makes it preferable at this time to employ mercury in connection with copper.

While I have indicated as one embodiment of my invention the use of ammoniated copper and of precipitated oxid of mercury in order to secure finely-divided metallic copper and mercury by the reducing action of the iron, it will be obvious to chemists that the desired combinations can be obtained in other ways. For instance, finely-divided copper can be secured in any desired manner and mixed with oxid of mercury, the mixture being then added to the finely-divided iron, or, if desired, the mixture may be added to oxid of iron produced from igniting iron oxalate at a very low temperature.

I do not regard the use of an easily-reducible metal, like mercury or copper, as practically available in connection with a nickel or other depolarizing-electrode of an alkaline storage battery to thereby insure contact between the particles of such active material, for the reason that in charging such an electrode is subjected to forced oxidation and the mercury or combination of mercury and copper would therefore be also oxidized, in which condition it would not increase the contact between the nickel particles and would, moreover, be somewhat soluble in the solution. For the nickel or depolarizing electrode of the battery therefore I prefer to use the electrode heretofore suggested by me, in which a mixture of nickel hydroxid and flake graphite is used, the large quantity of graphite employed insuring sufficient contact with the nickel particles for all practical purposes and the graphite being entirely unaffected by forced oxidation during the charging operation. It is preferable in assembling the battery that the proportion of the electrolytically-active oxidizable material employed should be in excess of the oxidizing capacity of the nickel on discharge in order that when the battery is completely discharged a small proportion of the oxidizable material will remain unoxidized.

It is to be understood that the invention can be used with other highly-oxidizable materials other than iron—such, for example, as cobalt and other metals whose heat of combination with oxygen is greater than that of copper.

Having now described my invention, what I claim is—

1. A reversible galvanic battery employing an alkaline electrolyte and whose oxidizable element on discharge is composed of an electrolytically-active insoluble material mixed with mercury for the purpose of preserving contact between the particles of the active material, the latter being more readily oxidizable than mercury, as and for the purposes set forth.

2. A reversible galvanic battery employing an alkaline electrolyte and whose oxidizable element on discharge is composed of an electrolytically-active insoluble material mixed with mercury and copper for the purpose of preserving contact between the particles of the active material, the latter being more readily oxidizable than either mercury or copper, as and for the purposes set forth.

3. An electrode for a reversible galvanic battery employing an alkaline electrolyte, said electrode containing finely-divided metallic iron or an oxid thereof mixed with mercury, as and for the purposes set forth.

4. An electrode for a reversible galvanic battery employing an alkaline electrolyte, said electrode containing finely-divided iron or an oxid thereof mixed with mercury and copper, as and for the purposes set forth.

5. An electrode for a reversible galvanic battery employing an alkaline electrolyte, said electrode containing finely-divided iron or an oxid thereof mixed with mercury and copper, the latter metal being in excess of the mercury, as and for the purposes set forth.

6. An electrode for a reversible galvanic battery employing an alkaline electrolyte, said electrode containing finely-divided metallic iron, or an oxid thereof, mixed with mercury and copper, the latter metal being in excess of the mercury and the iron being in excess of both of the added metals, as and for the purposes set forth.

7. An electrode for a reversible galvanic battery employing an alkaline electrolyte, said electrode containing mercury and finely-divided, electrolytically-active iron, or an oxid thereof, the proportion of the active material being sufficiently in excess of the mercury to prevent oxidation of the latter on discharge, as and for the purposes set forth.

8. An electrode for a reversible galvanic battery employing an alkaline electrolyte, said electrode containing mercury, copper and finely-divided, electrolytically-active iron, or an oxid thereof, the proportion of the active material being sufficiently in excess of the mercury and copper to prevent oxidation of the latter on discharge, as and for the purposes set forth.

9. In a reversible galvanic battery employing an alkaline electrolyte, the combination with an electrode containing an electrolytically-active nickel compound as a depolarizing element, of a second electrode containing electrolytically-active iron or iron compound mixed with mercury, as and for the purposes set forth.

10. In a reversible galvanic battery employing an alkaline electrolyte, the combination with an electrode containing an electrolytically-active nickel compound as a depolarizing element, of a second electrode containing electrolytically-active iron or iron compound mixed with mercury and copper, as and for the purposes set forth.

11. In a reversible galvanic battery employing an alkaline electrolyte, an electrode containing as its active material an insoluble metal which reduces when subjected to a charging-current, and mercury added thereto, as and for the purposes set forth.

12. In a reversible galvanic battery employing an alkaline electrolyte, an electrode containing as its active material an insoluble metal which reduces when subjected to a charging-current, and mercury and copper added thereto, as and for the purposes set forth.

13. In a reversible galvanic battery employing an alkaline electrolyte, an electrode containing as its active material an insoluble metal which reduces when subjected to a charging-current, and mercury added thereto, the active material being in excess of the latter to prevent oxidation of the mercury on discharge, as and for the purposes set forth.

14. In a reversible galvanic battery employing an alkaline electrolyte, the combination with an electrode containing an insoluble depolarizing active material, of a second electrode containing an insoluble active material which reduces with relative difficulty mixed with mercury, the proportion of the reducible active material being in excess of the mercury and being also in excess of the capacity of the depolarizing material, whereby the latter, on discharge, will be prevented from oxidizing the mercury, as and for the purposes set forth.

15. In a reversible galvanic battery employing an alkaline electrolyte, the combination with an electrode containing an insoluble depolarizing active material, of a second electrode containing an insoluble active material which reduces with relative difficulty mixed with mercury and copper, the proportion of the reducible active material being in excess of the mercury and copper and being also in excess of the capacity of the depolarizing material, whereby the latter, on discharge, will be prevented from oxidizing the mercury and copper, as and for the purposes set forth.

16. In a reversible galvanic battery employing an alkaline electrolyte, the combination with an electrode containing hydrated oxid of nickel as a depolarizing material, of a second electrode containing a mixture of electrolytically-active iron and mercury, the proportion of iron employed being in excess of the mercury and being also in excess of the oxidizing capacity of the nickel, whereby oxidation of the mercury, on discharge, is prevented, as and for the purposes set forth.

This specification signed and witnessed this 13th day of November, 1902.

THOS. A. EDISON.

Witnesses:
FRANK L. DYER,
J. F. RANDOLPH.